2,389,925

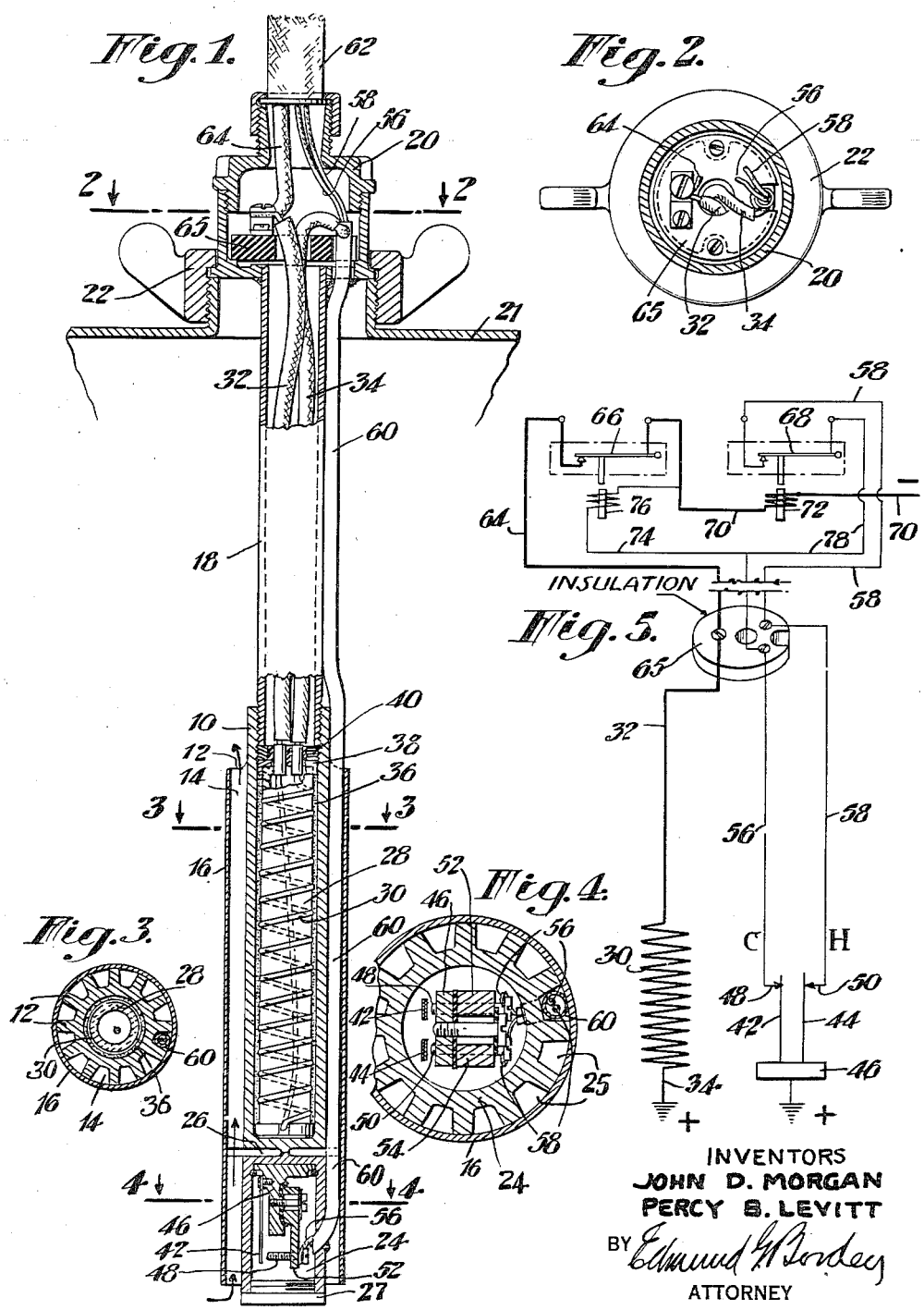
Nov. 27, 1945.  J. D. MORGAN ET AL  2,389,925
ELECTRIC HEATING APPARATUS AND METHOD
FOR HEATING CRANK CASE OILS
Filed Dec. 22, 1942
INVENTORS
JOHN D. MORGAN
PERCY B. LEVITT
BY Edmund G. Borden
ATTORNEY Patented Nov. 27, 1945

UNITED STATES PATENT OFFICE 2,389,925

ELECTRIC HEATING APPARATUS AND METHOD FOR HEATING CRANKCASE OILS

John D. Morgan, South Orange, and Percy B. Levitt, Millburn, N. J., assignors to Cities Service Oil Company, New York, N. Y., a corporation of Pennsylvania Application December 22, 1942, Serial No. 469,784

9 Claims. (Cl. 219—38)

This invention relates to electric heaters for heating crank case oils and method of heating. More particularly the invention relates to the electric heating of motor oils for military tanks.

Electric heaters have been provided for heating aeroplane motor oils in order to facilitate quick starting of aeroplane motors. However, so far as known, such heaters are not adapted for the special kind of service required for military tanks and other motor vehicles used under similar conditions. A tank motor can be started quite readily at temperatures of 10° F. or higher, but it is not usually advisable to permit the motor oil to go below a temperature of 10° F. On the other hand, the oil to be heated when this temperature is reached, such as crank case oil or the oil tank supplying the crank case, should be heated to a temperature of about 100° F. or higher.

The primary object therefore of the present invention is to provide an electric heater which will not be cut in until a predetermined low temperature has been reached in the oil to be heated, and also to provide a heater which will continue the heating for a relatively wide temperature range, for example, of from 80° to 100° F.

A further object of the invention is to provide an improved method of heating motor oils for military tanks in which the temperature of the oil is prevented from falling below a predetermined low level, but is heated over a relatively great temperature range in any given heating operation.

A still further object of the invention is to provide an improved electric heater which includes control means for cutting the heater in at a relatively low temperature and which will continue the heating for a sufficient period of time to raise the temperature of the oil to approximately 100° F. or higher.

With these and other objects of the invention in mind, the improved electric heater of the present invention comprises an electric resistance heating element mounted in a metal heat conducting casing, a dual thermostatic control mechanism adapted to cut the heater in at a low temperature of for example 10° F. and maintain the heating operation until the oil being heated is raised to a temperature of approximately 100° F. The invention includes an improved method for heating the motor oil for military tanks in which the temperature of the oil is maintained at a point above a predetermined low level and in which the oil is periodically heated to a relatively high temperature, after which it is permitted to cool to a relatively low temperature before it is again heated by the automatic control arrangement.

Other objects, features and advantages of the electric heater and method of the present invention will be apparent to those skilled in the art from the following more detailed description thereof, taken in connection with the accompanying drawing which forms a part of this application. In the drawing:

Fig. 1 is a vertical sectional view of the heater mounted in a motor oil tank or crank case.

Fig. 2 is a horizontal sectional view of the heater shown in Fig. 1, taken on the line 2—2 of Fig. 1.

Fig. 3 is a horizontal sectional view taken on the line 3—3 of Fig. 1.

Fig. 4 is an enlarged horizontal sectional view taken on the line 4—4 of Fig. 1.

Fig. 5 is a diagrammatic view showing certain elements of the heating apparatus in connection with the wiring arrangement.

Referring to Figs. 1 and 2 of the drawing, the electric heater of the present invention comprises in combination a casing 10 provided with integral external longitudinal ribs 12 separated by longitudinal channels 14. The casing 10 including the ribs 12 are enclosed in and attached to an outer cylindrical metal shell 16 which receives heat through the ribs 12. The heater is set substantially vertically in the oil to be heated which flows into the bottom of the shell 16, upwardly through the channels or conduits 14 and over the top of the outside shell 16. The heater includes a relatively long neck section 18 which terminates in a connector housing 20 by which the heater is mounted in a lubricating oil container, crank case or other motor oil container 21, by means of a winged union 22. The container 21 as shown, is broken away and preferably is the motor oil container or crank case of a military tank.

The casing 10 comprises a solid metal member which has been bored out to form a cavity for the electric heating element and which has been externally machined to provide the longitudinal channels 14 separated by the ribs 12, these channels and ribs extending along the length of the casing enclosing the electric heating unit. In making the casing 10 from a solid piece of metal stock of high heat conductivity such as aluminum, the upper end is threaded internally for attachment to the neck section 18.

The lower end of the cylindrical shell 16 extends below the casing 10 and surrounds and holds a solid metal temperature control chamber 24 which is preferably made by boring and machining a piece of metal stock of the same cross-section and character as that of the casing 10. The solid metal walls of the chamber 24 are machined almost exactly like the exterior of the casing 10 to form a plurality of channels 25 (Fig. 4) which correspond exactly to the channels 14 of the casing 10. The upper wall of the chamber 24 is separated from the bottom of the casing 10 by a space 26 to avoid the conduction of heat from the casing 10 to the control chamber 24. The lower end of the control chamber 24 is provided with a threaded plug closure 27, and the chamber is held in the shell 16 in the same manner as the casing 10, by means of soldering, welding or other suitable method of attachment. The arrangement of the control chamber 24 and the heating casing 10 is such that the oil to be heated first flows through the channels 25 and transmits its temperature to the control chamber and then flows directly up through the channels 14 in which it is heated.

The heating element mounted in the casing 10 comprises a hollow cylindrical zircon core 28 and a resistance wire 30 preferably of chromium, nickel-chromuim alloy or aluminum-cobalt-iron alloy. The wire 30 is wound around the core 28 in spaced relation so as to give uniform heating throughout the length of the heating cavity in the casing 10. The terminals of the resistance wire 30 are connected to lead wires 32 and 34 which extend through the metal neck section 18 into the housing 20.

In making up the heating unit the resistance wire 30 on the core 28 is preferably coated with a zircon wash made of 50% milled grain zircon and 50% of natural grain zircon bonded with a mixture of 6% $P_2O_5$ and 2% chromic acid. This coating is hardened on the wire and the core by heating the unit to a temperature of about 600° F. in an oven. The heating element is mounted in the casing 10 by inserting it in the cavity therein as shown, and packing the marginal spaces around the heating element with fine zircon sand which is a good dielectric and at the same time has a high heat conductivity. A very firm packing may be secured by vibrating the casing as the sand is introduced. This annular layer of densely packed zircon sand is represented in Figs. 1 and 3 by the reference character 36, the layer of sand being held in place with a gasket 38 and a threaded brass following ring 40. The lead wires 32 and 34 are embedded in a plastic material inside the ring 40 as shown.

The automatic mechanism for operating and controlling the heater includes a pair of bimetallic strips 42 and 44 (see Fig. 4), the upper ends of which are mounted in fixed position to a metal block 46 held in the upper portion of the chamber 24 by means of a locking ring, as shown. The bimetallic strips 42 and 44 are therefore electrically connected and grounded to the heater casing 10. and in turn thru the container 21 to the tank body. The free ends of the bimetallic strips 42 and 44 are adapted to engage adjustable screw connectors 48 and 50 respectively, the screws being set in separate electrically insulated mountings 52 and 54 respectively, fastened to but insulated from the block 46 in the manner shown in Figs. 1 and 4. The screws 48 and 50 are connected respectively to lead wires 56 and 58 which extend from the chamber 24 through a metal tube 60 which extends from chamber 24 into one of the conduits 25, through one of the channels or conduits 14 and into the housing 20. The tube 60 is sealed with respect to the chamber 24 and with respect to the housing 20, for example by soldering, so that oil is excluded from the housing 20 and the chamber 24. The lead wires 56 and 58 pass through the housing 20 and a conduit 62 to a switch mechanism, as shown in Fig. 5. A current supply conductor 64 is connected to the lead wire 32 by suitable mountings on an insulation block 65, and also extends from the housing 20 through the conduit 62, into the switching mechanism shown in Fig. 5, through which it is in turn connected to the negative terminal of the electric storage battery for the military tank or other vehicle.

The diagrammatic showing in Fig. 5 illustrates the relationship between the heater 30, the bimetallic strips, and the switching mechanism, which includes two micro-switches 66 and 68 which are adapted to be held open unless closed and held closed by solenoid relays. The current supplied to the resistance heating element 30 by wires 32 and 64 passes through a switch 66, one terminal of which is adapted to be connected to the wire 64, the other being connected to the electric storage battery of the military tank by a wire 70 which connects through a solenoid 72, for operating the switch 68. The lead wire 58 (H) terminates in the switch 68, while the lead wire 56 (C) is connected by a branch wire 74 through a solenoid 76 to the current supply wire 70 between switch 66 and solenoid 72, the solenoid 76 being adapted to close the switch 66. The lead wire 56 is also connected through a second branch wire 78 to the switch 68.

The showing in Fig. 5 illustrates the positions of the bimetallic strips 42 and 44 and the switches 66 and 68 (closed), which is the situation when the oil in the container or crank case 21 has reached the predetermined low temperature referred to above. Assuming this temperature to be 10° F., for example, the bimetallic strip 42 (Fig. 5) has just moved into contact with the screw connector 48 and established a circuit through the solenoids 76 and 72. Current is now being supplied from the electric battery through the wire 70, the switch 66, wires 64 and 32, to the heating element 30, for example at about 20.3 amps. (the positive terminal of the battery of course being connected to the body of the military tank and hence to lead wire 34, as in the usual practice). At the time the bimetallic strip 42 contacts the screw connector 48, a small current of, for example, 0.07 ampere, flows through lines 56 and 74, operates the solenoid 76 and closes the switch 66. As soon as current passes through the wire 70, the solenoid 72 is also operated and switch 68 is closed.

When the resistance heating element 30 has heated the oil in the tank sufficiently to raise the oil temperature a few degrees, the bimetallic strip 42 is affected and moves away from the screw connector 48 which cuts off the current flowing through the line 56. However, under all these low temperature conditions, the bimetallic strip 44 (Fig. 5) is always in contact with the screw connector 50, so that the switch 66 is retained in closed position by the current (about 0.07 amp.) flowing through the solenoid 76, branches 74 and 78, switch 68, and line 58. This condition is maintained for a considerable period of, for example, thirty minutes or other period of time sufficient to heat the body of motor oil in the container 21 to a temperature of, for example, 100° F. As the temperature reaches this point, or other desired point, at which the conector screw 50 is set, the bimetallic strip 44 moves away from this screw and stops the current through the line 58, and consequently stops the current through the solenoid 76, so that the switch 66 is automatically opened and the current supply to the heating element 30 stopped. Since no current flows through the line 70 when the switch 66 is open, and the bimetallic strip 44 is not in contact with the screw connector 50, the solenoid 72 would be discharged and permit the opening of the switch 68. Therefore, when the oil in the tank is at the predetermined high temperature or slightly above, the switches 66 and 68 are open and the bimetallic strips 42 and 44 are not in contact with the screw connectors 48 and 50. When the temperature in the container 21 falls below the predetermined high temperature, the bimetallic strip 44 will again contact the screw 50 connected with the line 58, but this will not close switch 68 or make a circuit.

The predetermined low and high temperatures determining the range over which the motor oil is to be heated may be changed as desired by properly setting the screw connectors 48 and 50 in accordance with the desired temperatures. For example, with certain types of oil, the low temperature may be zero degree Fahrenheit, and under certain conditions it may be desirable to heat the oil to a temperature of 150° F. in order to facilitate rapid lubrication of the tank motor and thereby permit relatively quick use of the military tank. The heater arrangement of the present invention is adapted to avoid the relatively long warm-up periods which are usually necessary and to insure proper lubrication of the motor when it is started. In many cases motors are damaged very badly because the motor oil is so cold and viscous that proper lubrication is not obtained when the motor is started.

The electric heater of the present invention produces a very rapid heating operation because the motor oil in the container or crank case completely fills the narrow conduits 14 in the casing of the heater. Almost as soon as the heat is supplied a relatively tall column of hot oil is produced in each conduit so that a thermal flow cycle is established upwardly through the casing. In this cycle the relatively cool oil enters the channels or conduits 25 and 14 from around the bottom of the shell 16, and this oil being of higher gravity than the hot oil in the top of the channels 14 produces a rather rapid flow of oil through the channels and over the top of the shell 16 which is preferably below the level of oil in the container or crank case 21. The relatively minor amount of heat transferred through the shell 16 to the oil on the outside of the shell is relatively insignificant compared to the amount of heat transferred through the channels 14 from the integral ribs 12 and the body of the casing 10.

A specific heater made in accordance with the features of the present invention had a heating section about seven inches long with the ribs 12 machined to a diameter of about 1¾". The other dimensions are in proportion so that the tubes or channels 14 are of a substantial size and heating capacity. An important feature of the method of heating crank case oils is that the body of oil is heated for a relatively long period of time over a rather wide temperature range as distinguished from the usual type of heating in which the temperature of the oil is maintained at a substantially constant temperature. Tests have shown that the maintenance of a constant temperature is unnecessary and that the present method avoids the rapid on-and-off fluttering of the controls and the electric current.

From the foregoing description of the invention, it will be apparent that various modifications may be made in the specific elements of the apparatus for accomplishing the results outlined. For example, the housing for the bimetallic strips or other temperature responsive elements may be constructed in a different manner and mounted differently if desired. The tubes 14 and 25 may be drilled instead of using the shell 16. In addition to supplying current to the heater from the battery of the military tank or other vehicle, it may alternatively be supplied from any suitable source of electric energy of proper voltage, the negative terminal of the current supply being connected to the wire 70 while the positive terminal of the supply is connected to the body of the tank which in its turn is electrically connected through to the lead wire 34 and block 46. The term "casing" as used in the claims may include the shell 16 as well as the element 10. Other modifications may be made without departing from the spirit of the present invention, as defined by the appended claims.

Having described the invention in its preferred form, what is claimed as new is:

1. In an electric immersion heater for heating motor crank case oils in an oil container associated with an internal combustion engine, the heater being mounted in a substantially vertical position in the container and including a metal casing of relatively great length compared to its width, an electric resistance heating unit inside said casing adapted to supply heat thereto, an improved metal casing for receiving heat from said heating unit having an outer wall surface provided with a series of long narrow oil heating conduits running longitudinally through the heater casing, said conduits being open at the lower and upper ends, whereby the oil in said conduits is heated quickly and thereby induced to flow upwardly therein to create a circulation of oil in the container during the heating operation.

2. An electric immersion heater as defined by claim 1 in which said conduits are cut in the metal of the casing thereby providing rapid and effective heat transfer to the oil in the conduits.

3. An electric immersion heater having an elongated electric resistance heating element including an elongated tubular metal casing for conducting heat to the liquid to be heated, an improved tubular metal casing having a wall containing a number of spaced ribs defining deep channels extending substantially the full length of the heating element, said channels being substantially surrounded by metal of the said casing for heating the oil.

4. In an electric heater having an elongated resistance heating unit mounted in a tubular metal casing for conducting heat from the heating unit, an improved metal casing including a metal wall surrounding said resistance heating unit and arranged to conduct heat therefrom, said wall having deep narrow channels extending longitudinally of the casing around its entire outer surface, said casing being covered with an outer metal shell covering said channels except for ports at the ends of the channels.

5. In an electric immersion heater adapted for vertical mounting in a container for heating a body of liquid, an elongated tubular metal casing containing an electric resistance heating element arranged to conduct heat to the metal casing for heating the liquid, the wall of said tubular casing having a series of deep channels extending longitudinally of the casing, a metal temperature control chamber mounted below and in spaced relation to said casing, said chamber having a channeled outer wall like said casing, a tubular metal shell open at the bottom and top covering the channels in said casing and chamber and attached thereto, said casing and chamber being arranged in said shell so that liquid will flow upward through the channels in the chamber wall and transmit its temperature thereto and then flow on up through the channels of the casing in which it is heated by heat from the heating element.

6. In an electric immersion heater particularly adapted for vertical mounting in a container for heating a body of motor crank case oil associated with an internal combustion engine of a military tank, an improved heater casing substantially completely enclosing an electric heating element and comprising a relatively thick wall of metal of high heat conductivity containing an annular series of longitudinal spaced ribs forming in said wall a series of relatively large passages extending lengthwise of the casing over substantially the entire length of the heating element, said ribs being arranged for upward flow of oil in the passages when the heater is mounted in a substantially vertical position in said body of oil.

7. An electric immersion heater for heating motor lubricating oils in an oil container associated with an internal combustion engine in which the heater is mounted in a substantially vertical position in the body of oil in the container, comprising a thick vertical metal casing of high heat conductivity, the wall of which contains an annular series of closely spaced vertical oil heating passages opening into the body of oil at their upper and lower ends, an electric resistance heating unit mounted in said casing and extending substantially the full length of said passages, said heater mounting including a thermostatic control compartment which is substantially unaffected by said electric resistance heating unit but which is immersed in the body of oil in the container, said compartment including a pair of temperature responsive bimetallic strips for establishing electric circuits, one of which is adapted to establish a circuit at the occurrence of a predetermined low temperature in the body of oil and thereby initiate the flow of current through said electric resistance heating unit, the other bimetallic strip being a part of a second circuit adapted to maintain the flow of current at said predetermined low temperature and over a temperature range of from approximately 80° to 150° F., said other bimetallic strip also being adapted to open the second circuit and stop the flow of current through said electric resistance heating unit when the temperature of the oil reaches a predetermined relatively high temperature.

8. An electric immersion heater for heating motor lubricating oils in an oil container associated with an internal combustion engine, comprising a heater casing, an electric resistance heating unit mounted in a cavity therein, a thermostatic control compartment associated with said heater and containing a pair of temperature responsive bimetallic strips one end of each of which is mounted in fixed position and the fixed ends electrically connected, an electric line for supplying current to said resistance heating element including therein a solenoid operated switch, a current outlet line to said solenoid from said current supply line in advance of said switch, a wire from said solenoid leading to a contact point for one of said bimetallic strips, a wire from a contact point for the other bimetallic strip connected into the wire leading to the contact point of the first-mentioned bimetallic strip and which includes a solenoid operated switch, the solenoid of which is in the current supply line.

9. In an electric heating apparatus for heating crank case oils in the oil container of an internal combustion engine, the apparatus including an electric heater mounted in said container and comprising an electric resistance heating element, a temperature responsive means including an electrical circuit for connecting a source of current with said electric resistance heating element, means activated by the establishment of said connection for maintaining said connection after said temperature responsive means has opened the circuit originally established, and separate temperature responsive means for disconnecting said source of current from the said electric resistance heating element.

JOHN D. MORGAN.
PERCY B. LEVITT.